United States Patent [19]
Jenevein

[11] Patent Number: 5,268,973
[45] Date of Patent: Dec. 7, 1993

[54] WAFER-SCALE OPTICAL BUS

[75] Inventor: Roy M. Jenevein, Austin, Tex.

[73] Assignee: The University of Texas System, Austin, Tex.

[21] Appl. No.: 822,960

[22] Filed: Jan. 21, 1992

[51] Int. Cl.$^5$ .............................................. G02B 6/12
[52] U.S. Cl. .................................. 385/74; 385/130; 359/163; 359/173
[58] Field of Search ................. 359/163, 173; 385/14, 385/129, 130, 142, 144

[56] References Cited

U.S. PATENT DOCUMENTS

| | | | |
|---|---|---|---|
| 3,964,824 | 6/1976 | Dixon | 385/115 |
| 4,358,858 | 11/1982 | Tamura et al. | 455/607 |
| 4,733,927 | 3/1988 | Jackson et al. | 385/129 |
| 4,787,692 | 11/1988 | Spanke | 350/96.16 |
| 4,802,182 | 1/1989 | Thornton et al. | 372/50 |
| 4,871,224 | 10/1989 | Kartensen et al. | 350/96.15 |
| 4,883,743 | 11/1989 | Booth et al. | 430/321 |
| 4,930,854 | 6/1990 | Albares et al. | 350/96.17 |
| 4,943,136 | 7/1990 | Popoff | 350/96.16 |
| 4,979,790 | 12/1990 | Walker | 385/14 |
| 4,989,935 | 2/1991 | Stein | 385/14 |
| 5,009,476 | 4/1991 | Reid et al. | 385/14 |
| 5,054,870 | 10/1991 | Lösch et al. | 385/14 |
| 5,061,027 | 10/1991 | Richard | 359/173 |

OTHER PUBLICATIONS

W. Myers, "GaAs targets 100-MHz-plus computers," *Computer*, vol. 24, No. 5, pp. 102-103, May 1991.

P. W. Dowd, "High Performance Interprocessor Communication Through Optical Wavelength Division Multiple Access Channels," *Proceedings of the 18th Annual International Symposium on Computer Architecture*, pp. 96-105, May 1991.

B. D. Clymer, "Optical Clock Distribution for VLSI" Doctoral Dissertation, Department of Electrical Engineering, Stanford Univ., 1987.

C. A. Brackett, "Dense Wavelength Division Multiplexing Networks: Principles and Applications," *IEEE J. Sel. Areas Commun.*, vol. 8, pp. 948-964, Aug. 1990.

H. Kobrinski, M. P. Vecchi, M. S. Goodman, E. L. Goldstein, T. E. Chapuran, J. M. Cooper, M. Tur, C-E. Zah and S. G. Menocal, "Fast Wavelength-Switching of Laser Transmitters and Amplifiers," *IEEE J. Sel. Areas Commun.*, vol. 8, pp. 1190-1202, Aug. 1990.

T. E. Mangir and A. Avizienis, "Fault-Tolerant Design for VLSI: Effect of Interconnection Requirements on Yield Improvement of VLSI Designs," *IEEE Transactions on Computers*, vol. C-31, pp. 609-615, 1982, published in U.S.

S. Rangarajan, D. Fussell and M. Malek, "Built-in Testing of Integrated Circuit Wafers," *IEEE Trans. Comput.*, vol. C-39, No. 2, pp. 195-205, Feb. 1990, published in U.S.

M-F. Chang and W. K. Fuchs, "Design and Parallel Testing of Wafer Scale Linear Arrays with High Harvest Rates," *1991 Proceedings of the International Conference on Wafer Scale Integration*, pp. 285-291, Jan. 1991, published in U.S.

L. T. Canham, "Silicon quantum wire array fabrication by electrochemical and chemical dissolution of wafers," *Appl. Phys. Lett.*, vol. 57, No. 10, pp. 1046-1048, Sep. 1990, published in U.S.

H. Tajima, Y. Okada, K. Tamura, "A High-Speed Optical Common Bus for a Multiprocessor System," *Trans. Inst. Electron. and Commun. Eng. Jpn.*, vol. 66, No. 1, pp. 47-48, 1983, published in Japan.

(List continued on next page.)

*Primary Examiner*—Frank Gonzalez
*Attorney, Agent, or Firm*—Arnold, White & Durkee

[57] ABSTRACT

An improved wafer-wide optical bus interconnect is described for use in wafer-scale integration systems. By optically coupling sub-systems on the wafer, faults normally found in electrically based interconnection topologies are avoided. The invention incorporates a planar waveguide which couples emitters and detectors distributed throughout the wafer. The waveguide transmits an omnidirectional emission from an optical diode to all detectors on the wafer. The only electrical connection between sub-systems on the wafer may be for power.

36 Claims, 5 Drawing Sheets

OTHER PUBLICATIONS

F. Lin, E. M. Strzelecki and T. Jannson, "Optical Multiplanar VLSI Interconnects based on Multiplexed Waveguide Holograms," *Applied Optics*, vol. 29, No. 8, pp. 1126–1133, Mar. 1990, published in U.S.

H. P. Herzig, "Holographic Optical Elements (HOE) for Semiconductor Lasers," *Optics, Comm.*, vol. 58, No. 3, pp. 144–148, 1986.

D. R. Pape and L. J. Hornbeck, "Characteristics of the deformable mirror device for optical information processing," *Opt. Eng.*, vol. 22, pp. 675–681, 1983, published in U.S.

A. D. McAulay, "An extendable optically interconnected parallel computer," *1986 Proceedings of the Fall Joint Computer Conf.*, pp. 441–447, Nov. 1986, published in U.S.

S. Dhar, M. A. Franklin and D. F. Wann, "Reduction of Clock Delays in VLSI Structures," *Proceedings of IEEE Conf. on Computer Design: VLSI in Computers*, pp. 778–783, 1984, published in U.S.

J. Fried, "An Analysis of Power and Clock Distribution for WSI Systems", *Wafer Scale Integration*, G. Saucier and J. Trilhe Eds., pp. 127–142, Elsevier Science Publ. B.V. (North-Holland), 1986, published in U.S.

B. D. Clymer and J. W. Goodman, "Optical clock distribution to silicon chips," *Opt. Eng.*, vol. 25, No. 10, pp. 1103–1108, 1986, published in U.S.

D. C. Keezer and V. K. Jain, "Clock Distribution Strategies for SIW: A Critical Survey," *1991 Proceedings of the International Conference on Wafer Scale Integration*, pp. 277–283, Jan. 1991, published in U.S.

S. J. Hedge, L. P. Jalowiecki and R. M. Lea, "WSI Interconnect Issues: Practical Experience Gained on the WASP Project," *1991 Proceedings of the International Conference on Wafer Scale Integration*, pp. 263–269, Jan. 1991, published in U.S.

E. E. Swartzlander, "WSI Macrocell Fault Circumvention Strategy," *1991 Proceedings of the International Conference on Wafer Scale Integration*, pp. 90–96, Jan. 1991, pubished in U.S.

D. G. Deppe, J. C. Campbell, R. Kuchibhotla, T. J. Rogers, and B. G. Streetman, "Optically-Coupled Mirror-Quantum Well InGaAs-GaAs Light emitting Diode," *Electronic Letters*, vol. 26, No. 20, pp. 1665, 1666, Sep. 1990, published in U.S.

M. R. Feldman and C. C. Guest, "Computer generated holographic optical elements for optical interconnection of very large scale integrated circuits," *Applied Optics*, vol. 26, No. 20, pp. 4377–4384, Oct. 1987, published in U.S.

A. C. Livanos, A. Katzir, A. Yariv, and C. S. Hong, "Chirped-grating demultiplexers in dielectric waveguides," *Appl. Phys. Letters*, vol. 30, No. 10, pp. 519–521, May 1977, published in U.S.

R. V. Schmidt, D. C. Flanders, C. V. Shank, and R. D. Standley, "Narrow-band grating filters for thin-film optical waveguides", *Appl. Phys. Letters*, vol. 25, No. 11, pp. 651–652, Dec. 1974, published in U.S.

H. Kogelnik and T. P. Sosnowski, "Holographic Thin Film Couplers," *The Bell System Technical Journal*, pp. 1602–1608, Sep. 1970, published in U.S.

R. K. Kostuk, J. W. Goodman, and L. Hesselink, "Design considerations for holographic optical interconnects," *Applied Optics*, vol. 26, No. 18, pp. 3947–3953, Sep. 1987, published in U.S.

E. Yablonovitch, E. Kapon, T. J. Gmitter, C. P. Yun, and R. Bhat, "Double Heterostructure GaAs/AlGaAs Thin Film Diode Lasers on Glass Substrates," *IEEE Photonics Tech. Letters*, vol. 1, No. 2, pp. 41–42, Feb. 1989, published in U.S.

L. A. Hornak, "Fresnel phase plate lenses for through-wafer optical interconnections," *Applied Optics*, vol. 26, No. 17, pp. 3649–3654, Sep. 1987, published in U.S.

C. H. Henry, G. E. Blonder, and R. F. Kazarinov, "Glass Waveguides on Silicon for Hybrid Optical Packaging," *Journal of Lightwave Technology*, vol. 7, No. 10, pp. 1530–1539, Oct. 1989.

WAFER-SCALE OPTICAL BUS

BACKGROUND

This invention relates to communication means for use in electronic systems. In particular, it relates to an omnidirectional optical interconnection communication network which uses a substantially planar optical waveguide to guide laser light communication in two dimensions, rather than in one dimension. Application of the invention is presently perceived to be in the field of integrated electronics as a substitute for wire connections, particularly in wafer-scale and multichip integrated systems.

In the world of integrated electronics, there is an ever increasing need for faster compute cycles. One attractive solution is wafer-scale integration, which is the direct use of a silicon wafer (gallium arsenide wafer or other suitable materials) as a substrate for the construction of an entire computing system, including processing, memory, input/output and other circuits. These systems could include processor, memory, floating point units, and input/output connections, and are particularly useful in signal processing and other applications where a large amount of processing capacity is required. Wafer scale integration provides improved speed while reducing the utilization of valuable circuit area for connection pads and input/output conditioning circuitry.

The complexity of interconnections and conductor routing between macrocells required for wafer-scale integration has been a severe problem and is a direct contributor to poor overall system yield. There have been many compromises in interconnection structures on the wafer but most fail because of the error prone nature of the interconnection medium. For example, global wire buses with close etches tend to be susceptible to shorts and open connections.

Current electro-optic systems utilize point-to-point communication, including the widespread use of fiber optics and other linear, effectively one-dimensional waveguides. Most point-to-point optical technologies are not inherently fault-tolerant, thus requiring complex logic and hardware to implement redundant sub-systems. Other proposed approaches to electro-optic communications, such as holography and movable mirrors, require precise alignment and considerable set up time, and hence are not optimal for communications at the processor/cache/memory interface level.

Given a set of equivalent components (macrocells) communicating on a wafer-scale computer system, the overall yield is a product of the component yield multiplied by the interconnection yield, hence there is clearly a need for high interconnection yield. The interconnection yield becomes critical when built-in testing techniques are used to detect and adapt to subsystem or component faults in wafer-scale systems. Recent work has shown that the use of pooled spares for fault circumvention is a viable technique for increasing yield in wafer-scale integration systems, but only where the interconnect yield can be made very high, much greater than the macrocell yield. Furthermore, slight improvements in interconnect yield can result in substantial improvements in overall system yield.

Three basic techniques currently exist for optically communicating between elements on a semiconductor surface: (1) direct connection with a point-to-point waveguide, (2) free-space unfocused broadcast and (3) free-space focused interconnection or imaging interconnections (holography).

The direct point-to-point connection method is efficient but fixes the topology in the same way as electrical bus connections fix the topology on the wafer. Free-space unfocused broadcast suffers from efficiency losses inherent in free-space transmission. In spite of its limitations, at least one experimental computer system has been built using a common free space optical bus. The use of holography as an approach to free-space focused interconnection is promising, but most work has utilized visible light and less is known concerning good holographic optical elements in the near infrared, where high speed optical technology has progressed. Work has also been reported on using deformable mirrors as an approach to free-space focused interconnection.

It is therefore desirable to produce a communication system for wafer-scale integration systems, and other similar high circuit density systems, that utilizes the advantages of optical communication methods while avoiding the difficulties attendant to the use of point-to-point, holographic, and other known techniques. It is further desired to avoid the need to construct a plurality of fixed point-to-point communication routes between various components or macrocells in a wafer-scale system, so that the communication system may be adaptable to changing topologies in a wafer-scale system.

SUMMARY OF THE INVENTION

The problems outlined above are in large part solved by the apparatus and method of the present invention.

The present invention comprises a direct connection of one or more optical emitters to one or more optical detectors, using an omnidirectional optical emitter which "broadcasts" its messages unfocused through a planar waveguide constructed on the wafer or suitable semiconductor substrate. The message is then receivable by all detectors coupled to the waveguide. This optical interconnection invention provides topology insensitive optical coupling of devices on the wafer. These devices can be at any level of complexity from simple cells to complete RISC processors or clusters of processing elements. Both global and local communications can be supported. In addition to providing communication, this invention can provide a clock channel to implement a global wafer-wide clock with minimum skew (limited only by the speed of light through the medium).

This invention overcomes serious obstacles implicit in wafer-scale system fabrication, particularly in fabricating interconnections between subsystems, by optically interconnecting all computing devices on the wafer. With the newer experimental fabrication techniques involving wafer carriers to improve yields, this proposed technology will increase performance without increasing cost.

The invention is not limited to wafer-scale system applications. The wafer-scale application was chosen because of its immediate need for an efficient, reliable communication system, and because of cost/performance advantages. In one alternative embodiment, one could mount a collection of chip elements on a suitable carrier and subsequently implant the optic transmitter/receiver and omnidirectional waveguide technology of this invention so as to enable optical communication between chip elements. The result, in effect, is an optical multichip carrier system.

In addition, this invention may be used for inter-wafer communications. Systems may be developed utilizing multiple wafers, where additional wafers may contain only memory, only processing units, or a mix of memory and processing units, with point-to-point optical connections between wafers, and each wafer comprising a planar waveguide according to this invention. This technique may be particularly useful because memory circuits are fabricated using significantly different processes than are processor circuits, and it may therefore be beneficial to fabricate them on different wafers. The only electrical connection between the wafers, and between the wafers and the outside world, could be power and ground, with all outside (off-wafer or inter-wafer) communication being optical. Inter-wafer communication may be accomplished with optical emissions generally perpendicular to the waveguides at wavelengths that efficiently penetrate both waveguides and wafer materials, using appropriately aligned emitters and detectors on selected wafers. Communication intra-wafer between major subsystems may also be optical. This invention will allow for the generation of systems with processing power in excess of 20,000 mips and 10,000 mflops per wafer.

One of the benefits of this invention is that it provides a very high interconnect yield between components installed on the wafer. Wire buses are more prone to errors (such as shorts and broken wires) than waveguides, due to the nature of the material involved and requirements for connectivity. The high interconnect yield of the present invention may be combined with the use of pooled spare electronic components to permit high effective wafer yields.

The invention also permits component fault circumvention to be implemented without regard to the topology of the failure. Using this invention, one component may communicate with working parts of the wafer while ignoring failed parts, without concern that the failed parts will prevent communication between them. In addition, no hardware alterations are needed. This feature will allow highly parallel, fault-tolerant systems to be constructed on a single wafer.

When a waveguide is used in the place of a wire bus structure, the fine grain nature of the wire bus structure disappears and much greater yields and reliability may be achieved in manufacturing wafer-scale systems. This invention can be considered to provide a wafer-wide optical bus as a system interconnection resource. Extensions of the concept lead to multiple independent concurrent communicating regions on the wafer, where a plurality of independent planar waveguides may be fabricated on a wafer, each being optically isolated from the others, to enable communications between selected subsets of devices on a wafer. This latter structure allows both local and global traffic to be accommodated optically. In alternative embodiments, various emitters may emit at different wavelengths, and tuned detectors may be used to differentiate between signals from the various emitters, thus enabling concurrent independent communications to be conducted in a single waveguide.

The present invention thus includes an electro-optical communication system to provide communications between subsystems in a wafer-scale integrated system, wherein a plurality of subsystems are fabricated on a single substrate wafer. The communication system comprises a thin planar optical waveguide deposited on the wafer to cover the electronic and electro-optic circuitry that is fabricated on the wafer, an optical emitter coupled to a first subsystem on the wafer and optically coupled to the waveguide, and an optical detector optically coupled to the waveguide and coupled to a second subsystem on the wafer. This invention allows the first subsystem to communicate with the second subsystem by emitting omnidirectional optical signals into the waveguide. The emitted light propagates omnidirectionally through the planar waveguide such that it may be received by the detector, independent of its placement.

In presently preferred embodiments, the waveguide may comprise $SiN_x$ or phosphorous-doped $SiO_2$, and in a preferred embodiment the waveguide thickness may be less than 10 microns, or even less than 1 micron. An optical terminator may be fabricated around the periphery of the waveguide to direct light reaching the periphery out of the waveguide and away from the wafer, or alternatively the terminator may be adapted to absorb the light reaching the periphery of the waveguide. In a still further embodiment, the light reaching the periphery may be directed into a highly doped region of the wafer.

The waveguide may cover the entire surface of the wafer. Alternatively, the waveguide may cover less than the entire surface of the wafer, so long as it encompasses all of the emitters and all of the detectors which are intended to communicate with one another according to this invention. More than one waveguide may be fabricated on a single wafer, and multiple waveguides on a wafer may be separated by optical terminators or other suitable means known in the art.

The emitters which are optically coupled to the waveguide may be end-fire mesa type emitters which protrude into the waveguide, or alternatively, they may be recessed emitters which do not protrude into the waveguide sufficiently to block the emissions of other emitters. The emitters and detectors may be fabricated directly on the substrate, or they may be separately fabricated and attached to the wafer by suitable techniques known in the art.

This invention also contemplates a method of electro-optical communication between subsystems in a wafer-scale integrated system, comprising providing an electro-optical communications system as described above, emitting encoded optical signals from an emitter in response to signals sought to be communicated so as to omnidirectionally transmit a corresponding light signal through the waveguide and receiving that light signal with the appropriate detector, which may then dispatch the signal to appropriate circuitry. The determination of which detector circuit is appropriate is by device address specification of the bus protocol being used. The signal could be a message, clock, or an encoding of both such that a global clock is provided within the communication region or partition.

The invention further contemplates a method of manufacturing an optical communication system that includes depositing a cladding layer of $SiO_2$ on the surface of a wafer overlaying the circuit layer and then depositing a $SiN_x$ confinement layer over the cladding layer. The cladding layer may be used to fill irregularities in the surface of the circuit layer and to provide a suitably flat surface for deposition of the waveguide, although a perfectly flat surface is not necessary. The confinement layer makes up the waveguide itself, and it must be abutted on both sides by materials that create a suitable index of refraction at both edges of the confinement layer. In the exemplary embodiments, the confinement layer is sandwiched between the cladding layer and air. An alternative method of manufacturing a waveguide according to this invention comprises depositing a cladding layer comprising HIPOX $SiO_2$ on the surface of the wafer, overlaying the circuit layer, and then depositing a confinement layer comprising phosphorous-doped $SiO_2$ on the cladding layer.

Other materials and methods may be used to fabricate the waveguide of this invention, and these examples are given only to set forth the presently preferred method of practicing this invention and are in no way limiting of the scope of the claims.

The present invention therefore provides an improved device for communication between devices, components or subsystems in wafer-scale integration systems or an optical chip carrier system. This invention further provides methods of communicating using such a system and methods of fabricating such a system. These and other advantages of the present invention will be further appreciated from the drawings and from the detailed description provided below.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiments thereof which are illustrated in the appended drawings, which drawings form a part of this specification.

It is to be noted, however, that the appended drawings illustrate only exemplary embodiments of the invention and are therefore not to be considered limiting of its scope, for the invention may admit to other equally effective embodiments.

DETAILED DESCRIPTION OF THE INVENTION

Figure 1:
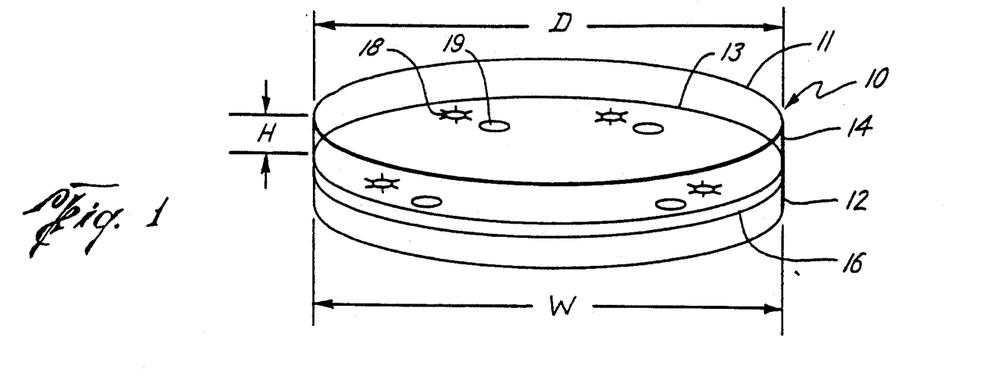
FIG. 1 is a diagrammatic perspective view of a wafer comprising a waveguide and associated devices according to the present invention.

Referring to FIG. 1, an exemplary embodiment of a wafer-scale electro-optic computer system 10 according to this invention comprises a semiconductor wafer 12 (of width W) having a cylindrical waveguide 14 several microns in height (H) grown on top of the circuit layer 16 which may comprise conventional integrated electronic circuitry. Electro-optic emitters 18 and detectors 19 (at least one of each per active device or component on the wafer) are electrically coupled to the corresponding circuitry and optically coupled to the waveguide. The emitters and detectors may, alternatively, be coupled to their corresponding circuits via optic means rather than electrically.

The novel approach of this invention uses planar waveguide 14 as a means of providing an optical bus which connects selected wafer components. While this waveguide is technically a three dimensional structure, it has a very small height H compared to its width D, and therefore an emitted wave front effectively propagates in two dimensions due to the waveguide's limited height and the fact substantially 100% reflection is achieved at the top edge 11 and bottom edge 13 of waveguide 14, because propagated light impinges upon these surfaces beyond the critical angle for the interface.

In an exemplary embodiment, this invention comprises a silicon or gallium arsenide wafer 12 of diameter W comprising a substrate 22 and a layer 16 containing the electrical and electro-optic elements, as shown in FIG. 1. A cylindrical waveguide 14 of diameter D and height H is grown on top of the wafer 12 and its circuitry. The diameter of the waveguide D may be slightly less than W, to avoid edge effect irregularities on the wafer, while in preferred embodiments the height H of the waveguide may be less than five microns.

Figure 2:
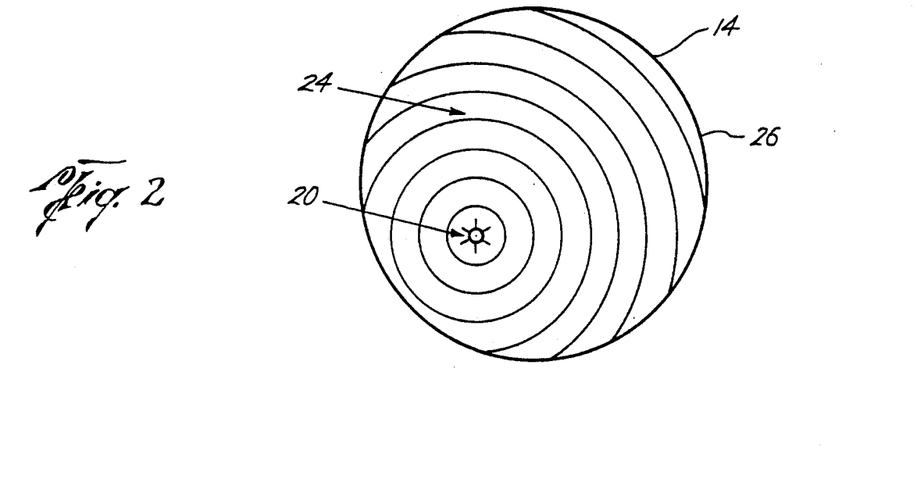
FIG. 2 is a top view of a waveguide according to the present invention showing the omnidirectional propagation of a wavefront from an optical emitter.

The planar waveguide 14 produces an optical bus that permits all detectors 19 on the wafer to receive a transmission substantially simultaneously. The emitter 18 generates an optical wavefront of equal energy propagating in all directions in the plane of waveguide 14. FIG. 2 illustrates propagation of an optical signal through waveguide 14 from emitter 20. The wavefronts 24 are shown at various points in time after emission to illustrate the omnidirectional nature of the waveguide 14 in two dimensions.

Since light need travel only 15 centimeters on a 6 inch wafer, dispersion, which is in the range of 10 to 50 nsec/km, will be negligible, and all detectors will receive the emitted signals substantially simultaneously.

When diode emitter 18 transmits its optical output into the waveguide, the signal is detectable everywhere on the wafer surface (with the possible exception of shadows caused by other emitters that protrude through the waveguide). This provides considerable flexibility in placement of electronic and electro-optic components on the wafer. This combination of diode emitter 18, waveguide 14 and detector 19, in effect, creates an optical bus which connects the transmitting diode emitter with all detectors that are coupled to the waveguide.

Figure 8:
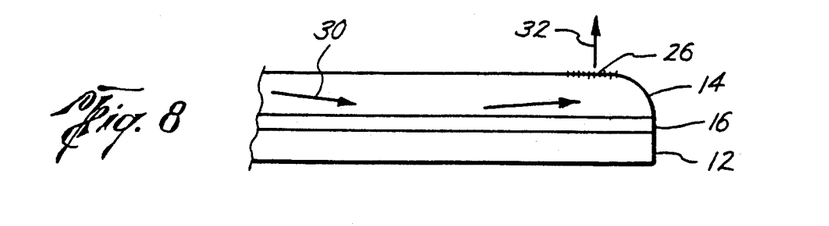
FIG. 8 is a cross section of the edge of a waveguide in accordance with an embodiment of the invention, illustrating the use of termination means to direct light out of the waveguide at its periphery.

Referring to FIG. 8, waveguide 14 comprises an optical terminator 26 placed at its periphery to prevent reflections of emitted optical signals from interfering with the primary transmission. In a preferred embodiment, optical energy 30 travels through waveguide 14, reaches terminator 26 and is deflected out of the waveguide. This is accomplished in a preferred embodiment using a grating coupler 26 (e.g. a Bragg grating), which is well known in the art, alone or combined with reflecting and refracting interfaces formed by modifying the shape of the edge of the waveguide by etching and deposition techniques. When light 30 impinges upon grating 26 it is deflected out of the waveguide. Due to the very thin nature of waveguide 14, a narrow grating 26 etched around its periphery will deflect essentially all of the light out of the waveguide. The deflected optical energy 32 may be captured by off-chip detectors (e.g. to provide input to a bus monitor or to transfer the signal to other off-wafer circuits) or permitted to dissipate. The terminator 26 may alternatively be designed to deflect the optical energy down and into a region of the silicon substrate which has been highly doped to enhance photon absorption, particularly when cladding layer 15 is omitted and waveguide 14 is in direct contact with semiconductor wafer 12. Termination may not be necessary in some cases in that reflection could be small and thus not detectable.

Current prototype embodiments of the invention have been operated at a transmission rate of up to 1.4 gigabits per second. As discussed previously, bandwidth may also be improved by emitting at different wavelengths simultaneously using multiple modulated emitters and tuned detectors within the same waveguide.

In an alternative embodiment, the waveguide is not continuous over the entire wafer, but is instead partitioned. This is useful where two or more distinct omnidirectional communication channels are desired. The waveguide may be partitioned by fabricating optical terminators 26, as discussed above, around the perimeter of each partition, such that light approaching a boundary between partitions is prevented from crossing into an adjacent partition, and is instead diverted out of the waveguide or absorbed.

Figure 6:
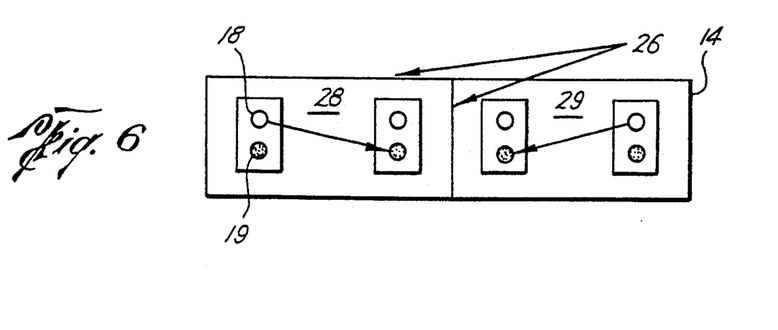
FIG. 6 is a plan view illustrating a partitioned waveguide, wherein two optically independent waveguides are fabricated on a wafer surface.

For example, referring to FIG. 6, waveguide 14 may be separated into a first part 28 and a second part 29 by use of optical termination at the edges. The detectors 19 in the first part 28 receive emissions only from the emitters 18 also located in the first part, and the detectors in the second part 29 receive emissions only from the emitters also located in the second part. If desired, a communication channel may be constructed between the first and second parts by conventional optical or electrical means, either on the wafer or off of it. Such partitioning of waveguide 14 can also be used, in effect, to bit slice the communications. Thus, for example, one part of waveguide 14 may be used for each bit of a byte and all 8 bits of the byte can be emitted simultaneously, one per partition. The bandwidth would thus be 1.4 gigabytes per second.

Figure 3:
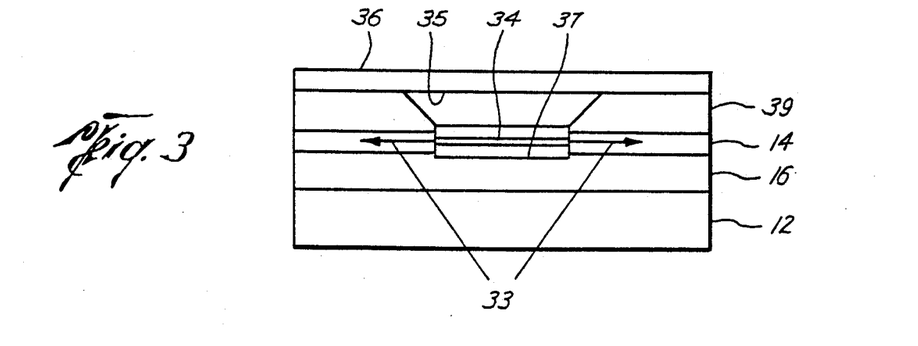
FIG. 3 is an enlarged cross-section of an embodiment of a wafer-scale system employing the present invention showing an inverted end-fire mesa emitter coupled to the waveguide layer.

An embodiment of the invention employs an inverted end-fire mesa emitter. As shown in FIG. 3, the emitter diode 34 couples its energy directly into the waveguide 14 by what is called "end-fire" coupling. This type of coupling minimizes the losses and maximizes the optical energy 33 coupled into the waveguide. In this arrangement the top electrical contact of the diode 35 is electrically coupled to all others emitter diodes. These top contacts can be connected via a metalization layer 36 (or alternatively via point-to-point "wired" connections) on top of the waveguide 14, and the drive circuit and current source can then be coupled to the other diode contact 37 below the waveguide 14 in the circuit layer 16 where the electronic components reside. A buffer layer 39 is placed between the waveguide and the metalization layer to support the metal layer and is chosen to provide a proper index of refraction to the interface between buffer 39 and waveguide 14.

Figure 4A:
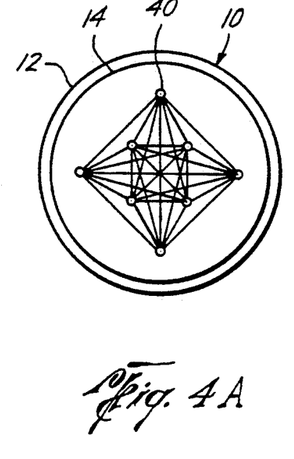
FIGS. 4a, 4b and 4c is a top view of a waveguide according to the present invention showing an exemplary placement of eight emitters and detectors to avoid shadowing.
Figure 4B:
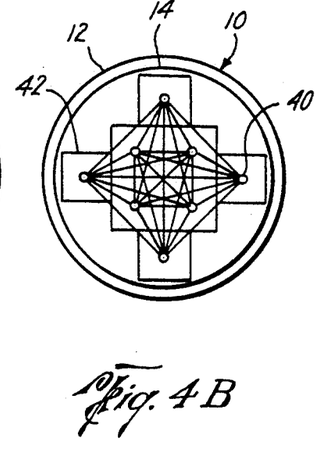
Figure 4C:
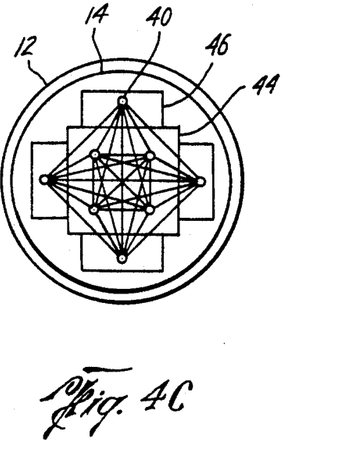

With this type of design, in which the emitter diodes 34 protrude through the waveguide 14, each diode may cast a shadow within part of the waveguide when another diode is emitting. This places some restrictions on the topological placement of emitters and detectors. All detectors should preferably be in line-of-sight of all emitters. Even with this restriction, placement of small numbers of emitter/detector pairs on the wafer is not a problem. FIG. 4a illustrates the placement of eight nodes 40 (emitter/detector pairs) on a wafer 10 such that all nodes are in line-of-sight of all other emitters. FIG. 4b shows an example of eight equal area square circuit regions 42 with one emitter/detector pair for each region. FIG. 4c shows an example with more efficient silicon usage, where circuit elements are of one of two shapes 44 and 46 but the wafer area occupied by each circuit element is the same.

Figure 5:
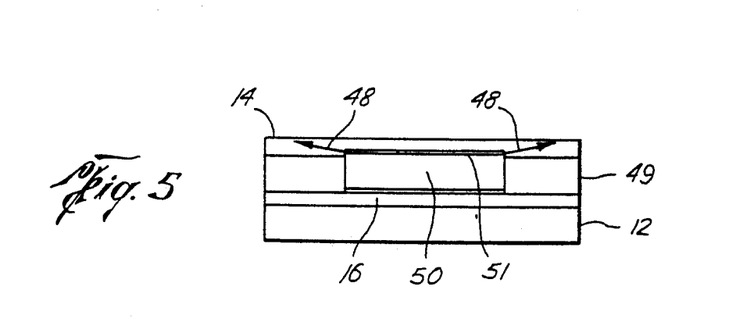
FIG. 5 is an enlarged cross-section showing a recessed emitter coupled to the waveguide layer.

Future optical emitters are expected to inject their optical signal 48 into waveguide 14 via a recessed emitter 50 as shown in FIG. 5. Because most of the emitter 50 lies below the plane of waveguide 14, the line-of-sight restriction disappears because the wavefront will propagate past the emitter without shadowing. Buffer layer 49 may be deposited during fabrication to elevate waveguide 14 above wafer 12 by a selected distance. The optical signal 48 is still injected into the waveguide directly as before, but since the active region 51 of emitter 50 is expected to be less than 3 microns from the top of diode 50, the emitter should not obscure the transmission from another source. This type of optical 15 signal injection is referred to herein as "recessed coupling."

When the number of emitter/detector pairs is small, "end-fire" coupling is simpler, while for large numbers of pairs "recessed" coupling may be employed to minimize consideration of shadowing in wafer design.

Systems utilizing this invention may be constructed such that the only electrical connections to the wafer system are for power supply. All external input and output signals, including wafer-to-wafer traffic, may be routed on and off the wafer through optical fiber connections. Load balancing may be accomplished by appropriate mixing of input/output requirements to processing elements with optical connections between the necessary wafers or sub-wafer components. For example, in a sparse input/output environment, all input/output connections may go to a single wafer for processing, while in a heavy input/output environment, input/output connections may be distributed to a plurality of wafers. The placement of input/output connections in general is an architectural decision, not a function of the optical connections.

In another embodiment, the emitter utilized is an optically-coupled mirror-quantum well InGaAs-GaAs light emitting diode (LED), for example, like that disclosed in Deppe, Campbell, Kuchibhatla, Rogers and Streetman, "Optically-Coupled Mirror Quantum Well IngaAs-GaAs Light Emitting Diode," Electronics Letters, Vol. 26, No. 20, Sep. 27, 1990. This device is the subject of U.S. Pat. No. 5,089,860, issued on Feb. 18, 1992, the disclosure of which is expressly incorporated herein by reference. The intensity of this light-emitting diode peaks near 1.0 μm. It has been shown that with a 410 angstrom spacing between the quantum well and the mirror on the surface, a 3 dB roll-off frequency of 1.4 GHz is obtained. This light emitting diode has a mesa-type structure with a diameter in the range of 50 to 100 microns. The emitter diode may be fabricated directly in place on the wafer, or fabricated separately and attached to the wafer.

Two prototype waveguides have been constructed, one with a 0.3 micron (3000 Å) high $SiN_x$ confinement layer (optical waveguide layer for confining the optical emission) and another with a 5 micron (50000 Å) phosphorous doped $SiO_2$ ($P:SiO_2$) confinement layer.

Figure 7:
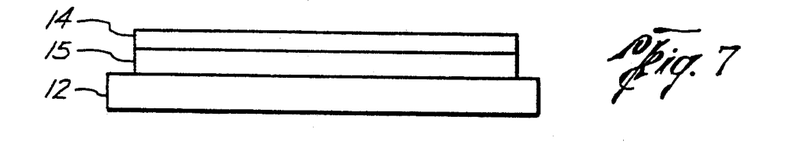
FIG. 7 is a cross section of a prototype waveguide deposited on a substrate.

Referring to FIG. 7, the 0.3 μm-thick waveguide was formed by first depositing a 2.5 μm-thick cladding or buffer layer 15 of $SiO_2$ on the Si substrate 12 followed by depositing the $SiN_x$ confinement layer 14 (3000 Å). The 5 μm-thick waveguide was formed by first producing a 15 μm-thick cladding or buffer layer 15 of HIPOX $SiO_2$ on the Si substrate 12 followed by the deposition of a 5 μm-thick phosphorous doped $SiO_2$ ($P:SiO_2$) confinement layer 14. The attenuation of both of these waveguides has been determined to be less than 0.5 dB/cm. Each prototype consisted of a waveguide that was approximately 1 cm square fabricated on a silicon substrate. In both cases the upper surface of the confinement layer was exposed to air, which yielded a suitable index of refraction and resulting critical angle. These prototypes are described as examples of embodiments of the waveguide of this invention, and are not intended to limit the scope of the claims to these particular materials and methods.

Work has been performed to test the coupling of an emitter to the waveguide, the extent of dispersion in the waveguide, and the quality of the signal waveform detected from "end-fire" coupling and transmission through a planar waveguide. To test the coupling, prototypes were constructed as described above, and the emitting edge of a diode was vertically aligned with the waveguide layer and placed at one end of the planar, rectangular waveguide. The optical output was measured and recorded as it emerged from the opposite edge of the waveguide, thus allowing a measurement of the desired coupling and transmission characteristics with a detecting photodiode and other instrumentation.

Figure 9:
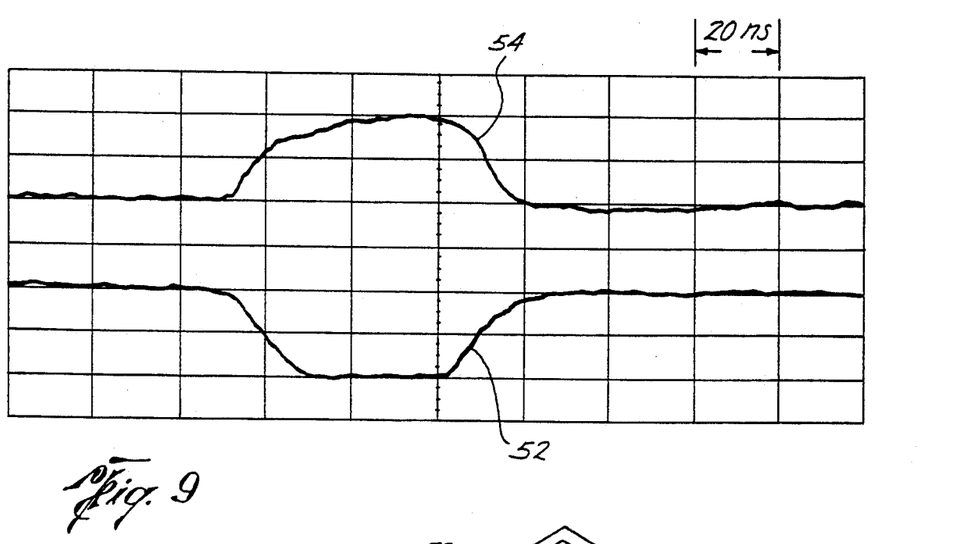
FIG. 9 is a graph of a light pulse input to and output from an experiment with a 5 micron waveguide constructed in accordance with the present invention.

The pulse response of the 5 micron waveguide was measured using a 1.0 KHz 50 ns wide pulse source which has a rise time of 9.4 ns. FIG. 9 shows a dual trace of the drive pulse 52 (lower trace) and the detector output 54 (upper trace), both with 20 ns/div horizontal timebases. The detector was a silicon PIN photodiode and the detector output was displayed directly. The fall time of the detector output 54 was identical to the fall of the LED drive 52 from the pulse source. The detector rise was initially identical but then decreased slightly. Also, the signal to noise margins were quite acceptable. The signal response characteristics were acceptable in terms of both rise/fall times and signal quality. The detector diode used for signal measurement can be improved, without much effort, to provide even better response and optical efficiency.

Measurement of the optical output at the edge of both a 0.3 and a 5 micron waveguide showed that light was emitted all along the waveguide, confirming that the waveguide created a two dimensional, omnidirectional optical bus. The 5 micron waveguide provided improved coupling and quite consistent output along the edge as compared to the 0.3 micron device. Due to its extreme thinness, the 0.3 micron waveguide is much more sensitive to irregularities in fabrication, and its performance may be improved by improved fabrication techniques.

Figure 10:
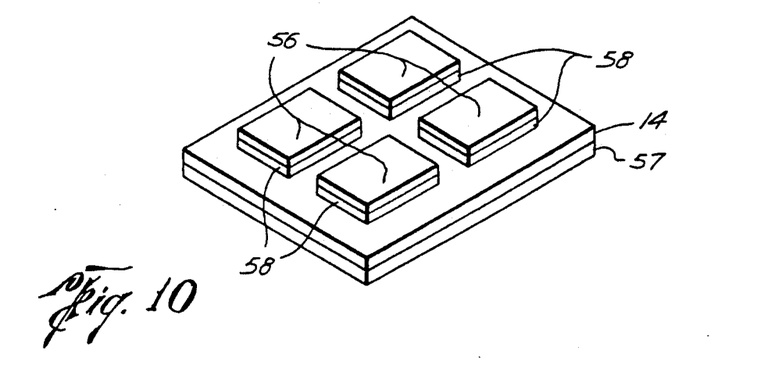
FIG. 10 is an alternative embodiment of the present invention illustrating a waveguide used to connect separate chip modules.

Referring now to FIG. 10, an alternative embodiment of the present invention is presented. In contrast with the embodiment of FIG. 1, ,in the embodiment of FIG. 10, a number of separate chips 56 are mounted upon a single waveguide 14 which is mounted on a carrier substrate 57. Between each of chips 56 and waveguide 14 are waveguide interface and optical transducer chips 58, which include emitters and detectors, in accordance with the present invention, allowing individual chips 56 to communicate with each other through waveguide 14. Both interchip and intrachip communication can be provided in this manner.

Referring now to FIGS. 11-14, presented are embodiments of emitters 18 and detectors 19 which incorporate a ring grating, in accordance with the present invention.

Figure 11:
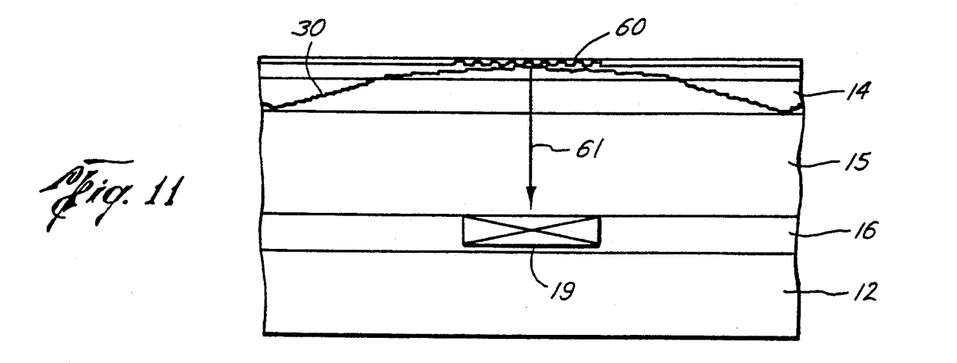
FIG. 11 is an embodiment of a light detector using a ring grating, in accordance with the present invention.
Figure 12:
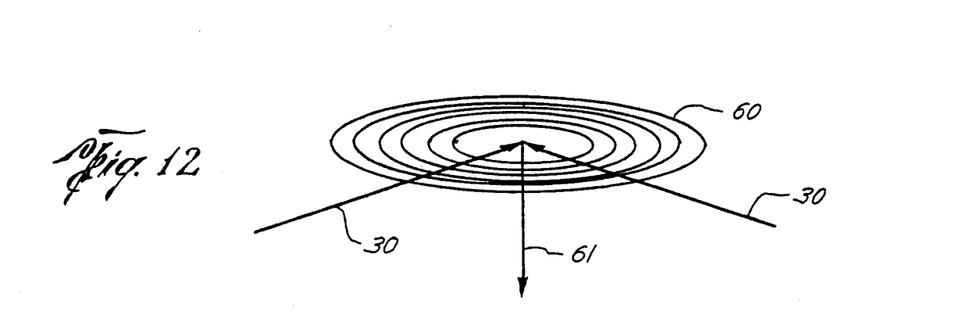
FIG. 12 is the ring grating used in the embodiment shown in FIGS. 11, 13, 14, and 16.

Referring to FIG. 11, detector 19, which can be, for example, a PIN photodiode, receives a portion of the energy passed through waveguide 14 by use of a concentric ring grating 60. An isometric view of ring grating 60 is shown in FIG. 12.

The spacing between the rings of grating 60 is set so that deflection of optical energy 30 travelling within waveguide 14 will deflect from ring grating 60 so as to be incident upon detector 19, as shown by ray 61.

Figure 13:
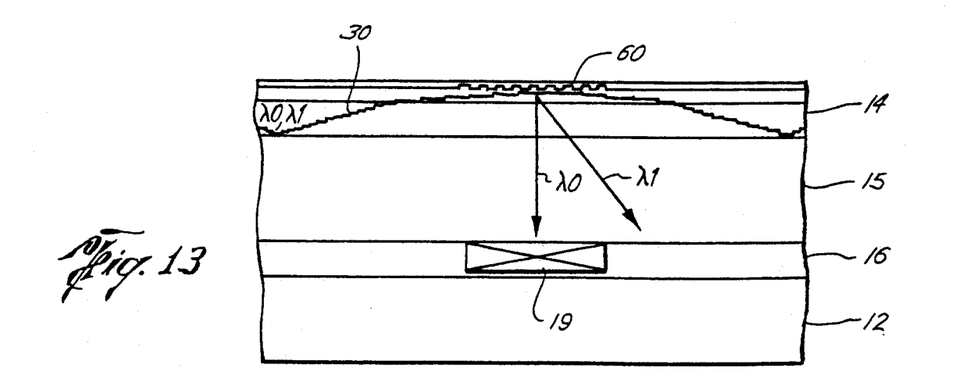
FIG. 13 is an embodiment of an frequency-selective detector, in accordance with the present invention.

The diameter of grating 60 determines the ratio of deflected to non-deflected light, and hence how much energy is diverted to detector 19 versus how much energy passes by detector 19. Grating 60 is formed in a concentric ring geometry so that regardless of the angle of incidence of signal 30, deflection occurs along ray 61, onto the detector, as shown in FIG. 12. Tunable detectors can be made by adjusting the spacing between the rings (i.e., the grating spacing) so that deflection will occur for the desired wavelength, and other wavelengths will be deflected at angles other than 90°, and will not be incident upon detector 19, as shown in FIG. 13. Detector 19, shown in FIG. 13 will respond to signal 30 of wavelength $\lambda_0$, but not of wavelength $\lambda_1$.

Figure 14:
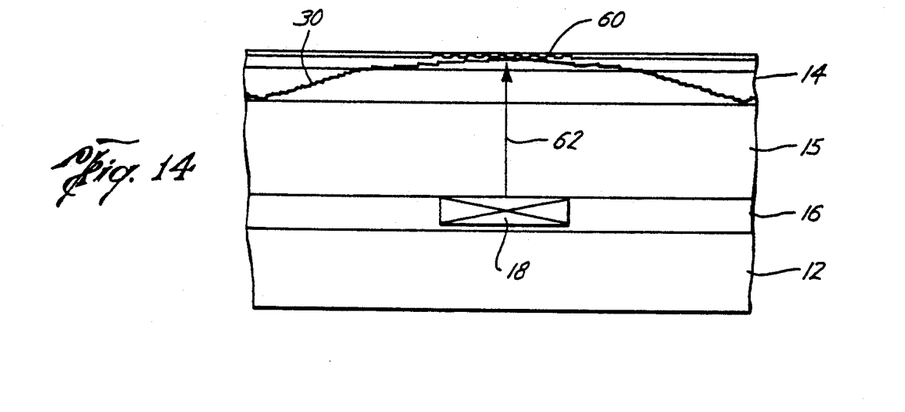
FIG. 14 is an embodiment of an emitter using a ring grating, in accordance with the present invention.

In a similar fashion, referring to FIG. 14, emitter 18 can be configured in combination with grating 60 so that signal 62, emitted by emitter 18, will strike grating 60, and will deflect substantially at a 90° to produce signal 30 travelling within waveguide 14.

Figure 15:
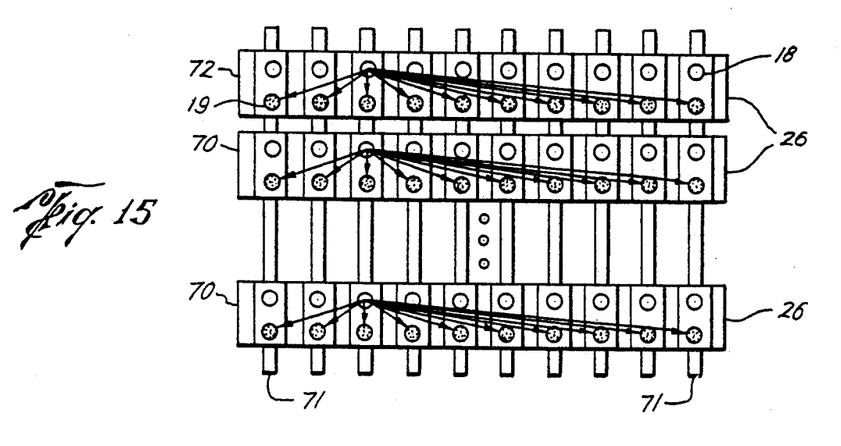
FIG. 15 is an example of an optical back plane, in accordance with present invention.

The present invention may also be used to develop a back plane-type interconnect. Referring to FIG. 15, each optical partition 70 on the back plane corresponds to a data or control item across all back plane slots 71. Optical strobe partition 72 generates the timing for each slot 71 to pick off the data from partitions 70. Since the propagation delay of the optical strobe is identical to that of the data arrival, the difference in the arrival time of signal at each slot 71 is accounted for. Electrical to optical conversion occurs at the back plane. Each slot 71 would have a bus protocol circuit for handshake, timing and data buffering, as commonly known in the art. Each partition 70 could use multiple wavelengths which may be used to increase the bandwidth. For example, a back plane with 128 bit partitions using four wavelengths (four emitters and four detectors for each partition) would have an overall bandwidth of 102.4 gigabytes.

Figure 16:
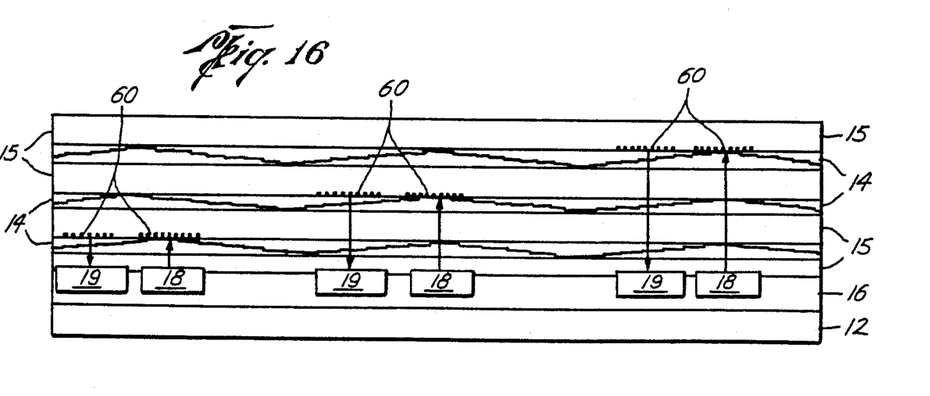
FIG. 16 is a multiple-layer waveguide and a wafer and associated devices, according to the present invention.

Referring now to FIG. 16, presented is a multi-layer version of the present invention which can be produced by layering a plurality of alternating waveguide layers 14 and cladding layers 15 on top of substrate 12 and electrical circuitry 16. Ring gratings 60 are placed on top of the waveguide 14 for which omnidirectional coupling is to occur. Beneath each grating 60 is a located either emitter 18 or detector 19 which permits transmission of signals, and receipt of signals, from only the desired waveguide 14.

Such a multi-layer embodiment could, for example, provide a system with concurrent global clock, with concurrent local and global communications. In a multi-layer system, any of the layers could be partitioned, thus further increasing signal bandwidth. In an alternative embodiment of the multilayer version of the present invention, byte transmission could be sliced so that one bit was assigned to each of eight layers, and one layer was reserved for an optical strobe, if necessary. In this way, transmission would be byte serial rather than bit serial.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. An electro-optical communication system to provide for communication between subsystems in a wafer-scale integrated system, wherein a plurality of subsystems are fabricated on a single substrate wafer including a first subsystem and a second subsystem, comprising:
    a planar omnidirectional optical waveguide deposited on a first surface of the wafer;
    an optical emitter coupled to the first subsystem and optically coupled to the waveguide;
    an optical detector optically coupled to the waveguide and coupled to the second subsystem.

2. The system of claim 1, wherein the waveguide comprises a terminating means at its periphery, the terminating means being adapted to prevent light reaching the periphery of the waveguide from being reflected back into the waveguide.

3. The system of claim 1, wherein the waveguide comprises $SiN_x$.

4. The system of claim 1, wherein the waveguide comprises phosphorous doped $SiO_2$ ($P:SiO_2$).

5. The system of claim 1 wherein a thickness of the waveguide is less than 8 microns.

6. The system of claim 1, wherein the emitter is recessed below a plane of the waveguide such that it does not substantially block the propagation of light through the waveguide.

7. An optical communication system adapted to provide for communication between subsystems in a wafer-scale integrated system, wherein a plurality of subsystems are fabricated on a single substrate wafer including a first subsystem and a second subsystem, comprising:
    a planar omnidirectional optical waveguide deposited on the wafer;
    optical emitting means electrically coupled to the first subsystem and optically coupled to the waveguide and adapted to generate an encoded optical signal and couple the signal into the waveguide;
    optical detecting means optically coupled to the waveguide and electrically coupled to the second subsystem and adapted to detect an optical signal propagating through the waveguide.

8. The system of claim 7, further comprising optical terminating means positioned at the periphery of the waveguide for preventing light that reaches the periphery from reflecting back into the waveguide.

9. A method of electro-optical communication between subsystems in a wafer-scale integrated system, comprising:
    providing an electro-optical communication system comprising a planar waveguide, an emitter coupled to a first subsystem and adapted to omnidirectionally emit an encoded optical signal into the waveguide, and a detector coupled to a second subsystem and adapted to receive said optical signal from said waveguide;
    emitting encoded optical signals from the emitter in response to a signal sought to be communicated from the first subsystem so as to omnidirectionally transmit a light signal throuqh the waveguide;
    receiving said light signal with the detector and coupling the signal to the second subsystem;
    whereby effecting optical communication between a first subsystem and a second subsystem in a wafer-scale integration system is effected.

10. A method of manufacturing an optical communication system for a wafer-scale integration system comprising:
    providing a wafer-scale integrated electronic system having an electro-optic emitter and an electro-optic detector coupled to circuitry fabricated on a wafer;
    depositing a cladding layer of $SiO_2$ on the surface of the wafer;
    depositing a $SiN_x$ confinement layer on the cladding layer;
    so as to construct a planar waveguide on the surface of the wafer, the waveguide being coupled to the emitter and to the detector.

11. A method of manufacturing an optical communication system for a wafer-scale integrated system comprising:
    providing a wafer-scale integration system having an electro-optic emitter and an electro-optic detector coupled to circuitry fabricated on a wafer;
    depositing a cladding layer comprising HIPOX $SiO_2$ on the surface of the wafer;

depositing a confinement layer comprising phosphorous-doped SiO$_2$ on the cladding layer;

whereby a planar waveguide is constructed on the surface of the wafer, the waveguide being coupled to the emitter and to the detector.

12. An electro-optical communication system to provide for communication between subsystems in an electronic system, wherein a plurality of integrated circuits are mounted on a multi-chip carrier, including a first circuit and a second circuit, comprising:

a planar omnidirectional optical waveguide deposited over the integrated circuits mounted on the carrier;

an optical emitter coupled to the first circuit and optically coupled to the waveguide;

an optical detector optically coupled to the waveguide and coupled to the second circuit.

13. The system of claim 12, wherein the waveguide comprises a terminating means at its periphery, the terminating means being adapted to direct light reaching the periphery of the waveguide out of the waveguide.

14. The system of claim 12, wherein the waveguide comprises SiN$_x$.

15. The system of claim 12, wherein the waveguide comprises phosphorous doped SiO$_2$ (P:SiO$_2$).

16. The system of claim 12 wherein the thickness of the waveguide is less than 8 microns.

17. The system of claim 12, wherein the emitter is recessed below the plane of the waveguide such that it does not substantially block the propagation of light through the waveguide.

18. An electro-optical communication system used to provide for communication between a plurality of subsystems in an electronic system comprising:

at least one optical emitter, and at least one optical detector, coupled to each of said plurality of subsystems; and a planar omnidirectional optical waveguide optically coupled to each of said emitters and detectors, whereby omnidirectional optical communication between any emitter and any detector is provided.

19. The system of claim 18, wherein said plurality of subsystems are fabricated on a single substrate wafer.

20. The system of claim 18, wherein said plurality of subsystems are integrated on a substrate wafer, at least one of said subsystems being integrated on a substrate wafer separate from other of said subsystems.

21. An electro-optical communication system to provide for communication between subsystems in a wafer-scale integrated system, wherein a plurality of subsystems are fabricated on a single substrate wafer including a first subsystem and a second subsystem, comprising: a planar optical waveguide deposited on a first surface of the wafer; an optical emitter coupled to the first subsystem and optically coupled to the waveguide, said emitter being recessed below a plane of the waveguide whereby said emitter does not substantially block the propagation of light through the waveguide; and an optical detector optically coupled to the waveguide and coupled to the second subsystem.

22. An electro-optical communication system to provide for communication between subsystems in an electronic system, wherein a plurality of integrated circuits are mounted on a multi-chip carrier, including a first circuit and a second circuit, comprising:

a planar optical waveguide deposited over the integrated circuits mounted on the carrier;

an optical emitter coupled to the first circuit and optically coupled to the waveguide, the emitter being recessed below the plane of the waveguide whereby the emitter does not substantially block the propagation of light through the waveguide; and an optical detector optically coupled to the waveguide and coupled to the second circuit.

23. The system of claim 1 wherein the subsystems comprise electronic elements.

24. The system of claim 1 wherein the subsystems comprise optical elements.

25. The system of claim 1 wherein the subsystems comprise hybrid electro-optical elements.

26. The system of claim 7 wherein the subsystems comprise electronic elements.

27. The system of claim 7 wherein the subsystems comprise optical elements.

28. The system of claim 7 wherein the subsystems comprise hybrid electro-optical elements.

29. An electro-optical communication system to provide for communication between subsystems in an electronic system, comprising:

a plurality of substantially planar omnidirectional optical waveguides;

at least one emitter coupled to one of said subsystems and coupled to at least one of said waveguides;

at least one detector coupled to one of said subsystems and coupled to at least one of said waveguides;

whereby any one of said emitters can broadcast optical signals to all of the detectors that are coupled to the same waveguide that said one emitter is coupled to, and any one of said detectors can receive optical signals broadcast from all of the emitters that are coupled to the same waveguide that said one detector is coupled to.

30. The method of claim 9, wherein the first subsystem comprises a clock signal generator, and wherein said encoded optical signals comprise a clock signal for coordinating operation of the wafer-scale integrated system.

31. The electro-optical communication system of claim 12, wherein the first circuit comprises a system clock adapted to transmit a clock signal via said planar omnidirectional optical waveguide.

32. An electro-optical communication system to provide for communication between subsystems in a wafer-scale integrated system, wherein a plurality of subsystems are fabricated on a single substrate wafer including first, second, third and fourth subsystems, comprising:

a first planar omnidirectional optical waveguide deposited on a first surface of the wafer;

a second planar omnidirectional optical waveguide deposited on the first waveguide;

a first optical emitter coupled to the first subsystem and optically coupled to the first waveguide;

a first optical detector optically coupled to the first waveguide and coupled to the second subsystem;

a second optical emitter coupled to the third subsystem and optically coupled to the second waveguide; and a second optical detector optically coupled to the second waveguide and coupled to the fourth subsystem.

33. An electro-optical communication system to provide for communication between a sending system and a receiving system, comprising:

an optical emitter coupled to said sending system for generating an optical signal containing information to be transmitted from said sending system to said receiving system;

a planar omnidirectional optical waveguide coupled to said optical emitter, whereby said optical signal may be broadcast throughout said waveguide; and an optical detector coupled to said waveguide and coupled to said receiving system, for receiving said optical signal from said waveguide and for conducting said information to said receiving system.

34. The communication system of claim 33, wherein said waveguide is coupled to said optical emitter by apparatus comprising an optical fiber.

35. The communication system of claim 33, wherein said detector is coupled to said waveguide by apparatus comprising an optical fiber.

36. The communication system of claim 33, wherein said waveguide is coupled to a plurality of said emitters and to a plurality of said detectors.

* * * * *